United States Patent [19]

Relis

[11] Patent Number: 4,625,205

[45] Date of Patent: Nov. 25, 1986

[54] REMOTE CONTROL SYSTEM TRANSMITTING A CONTROL PULSE SEQUENCE THROUGH INTERLOCKED ELECTROMECHANICAL RELAYS

[75] Inventor: Matthew J. Relis, Teaneck, N.J.

[73] Assignee: Lear Siegler, Inc., Santa Monica, Calif.

[21] Appl. No.: 559,390

[22] Filed: Dec. 8, 1983

[51] Int. Cl.⁴ .............................................. H04Q 1/00

[52] U.S. Cl. .............................. 340/825.66; 361/166; 102/217; 371/8; 340/825.01

[58] Field of Search ...................... 340/825.01, 825.66, 340/825.57, 825.04; 328/131.1, 130.1; 307/441, 592, 219, 113; 377/52, 110; 361/166, 168.1, 169.1, 249; 371/8; 89/1.5 E, 1.5 F, 1.812; 102/217; 318/564; 364/187, 119

[56] References Cited

U.S. PATENT DOCUMENTS

| | | | |
|---|---|---|---|
| 2,416,330 | 2/1947 | Labin et al. | 179/15 |
| 2,443,198 | 6/1948 | Sallach | 177/353 |
| 3,252,141 | 5/1966 | Galin | 340/164 |
| 3,258,613 | 6/1966 | Felcheck et al. | 307/88.5 |
| 3,275,884 | 9/1966 | Segall et al. | 315/163 |
| 3,306,208 | 2/1967 | Bergey et al. | 102/70.2 |
| 3,316,451 | 4/1967 | Silberman | 317/80 |
| 3,348,197 | 10/1967 | Akers, Jr. et al. | 371/8 |
| 3,453,496 | 7/1969 | Wright et al. | 317/80 |
| 3,586,918 | 6/1971 | Roland | 317/139 |
| 3,619,792 | 11/1971 | Capeci | 328/130 |
| 3,748,540 | 7/1973 | Eggenberger et al. | 307/441 |
| 3,748,955 | 7/1973 | Gatermann et al. | 89/1.814 |
| 3,888,181 | 6/1975 | Kups | 102/70.2 |
| 3,992,948 | 12/1975 | Krehan | 89/1.5 |
| 4,072,898 | 2/1978 | Hellman et al. | 325/37 |
| 4,127,823 | 11/1978 | Frost | 328/130.1 |
| 4,174,517 | 11/1979 | Mandel | 340/310 |
| 4,245,347 | 1/1981 | Hutton et al. | 445/70 |
| 4,324,182 | 4/1982 | Kirby et al. | 102/217 |

*Primary Examiner*—Donald J. Yusko

*Attorney, Agent, or Firm*—Pretty, Schroeder, Brueggemann & Clark

[57] ABSTRACT

A remote control system including a central encoder for transmitting a single sequence of control pulses to a plurality of remote decoders, each of which performs a predetermined function when it has received a selected number of pulses. Reliability of the system is enhanced by including in the encoder and all of the decoders a number of electromechanical relays arranged in a special triple redundant configuration, such that no failure in any one relay can cause a decoder to perform its function at an undesired time or can prevent a decoder from properly performing its function at a desired time. In addition, the special use of supplemental relay contacts ensures that no failure of any solid state device in the encoder or decoders can cause a decoder to perform its function at an undesired time.

32 Claims, 7 Drawing Figures

EMERGENCY JETTISON SYSTEM

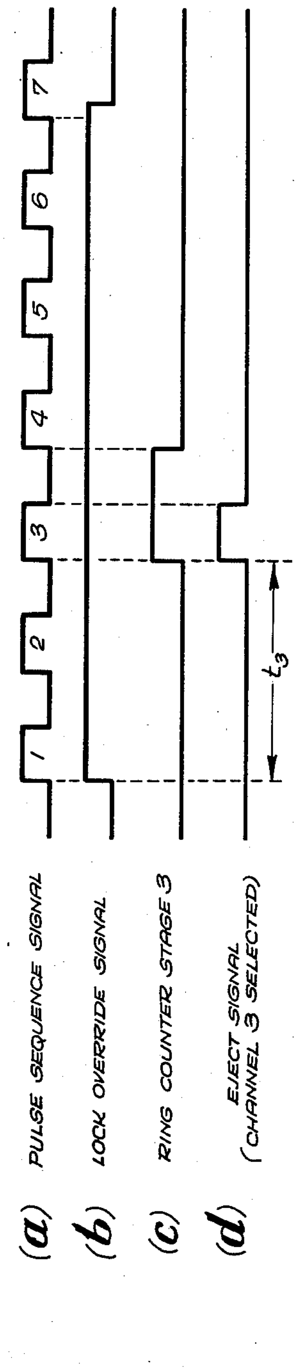
Fig. 2
Fig. 5
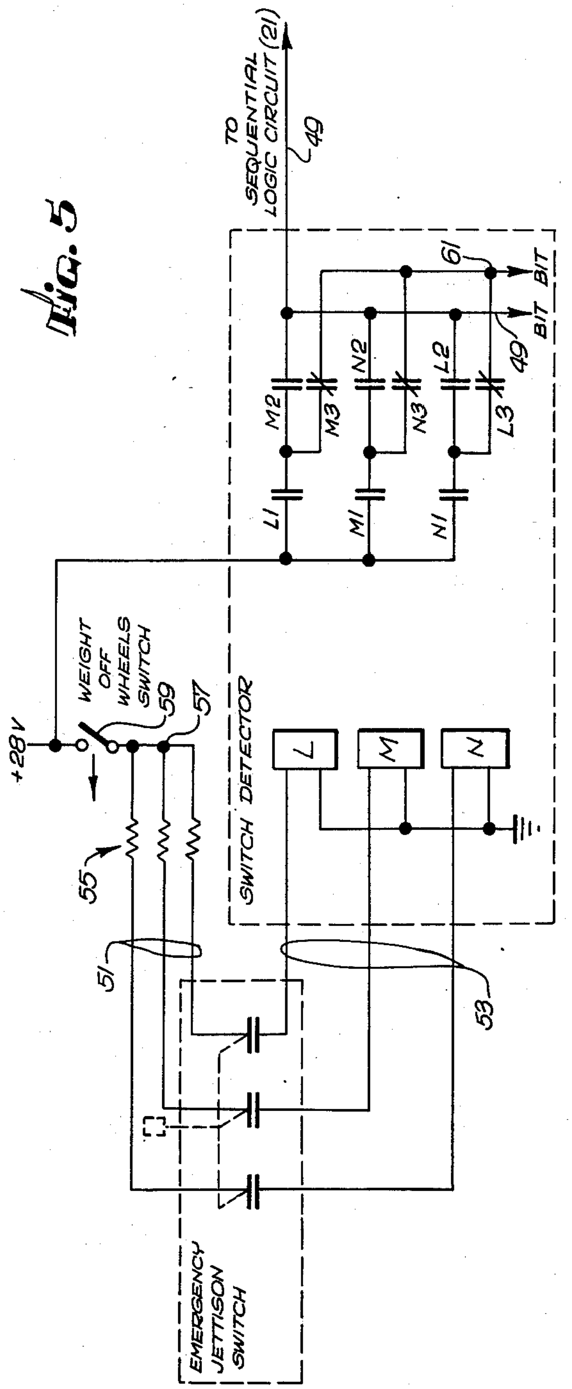

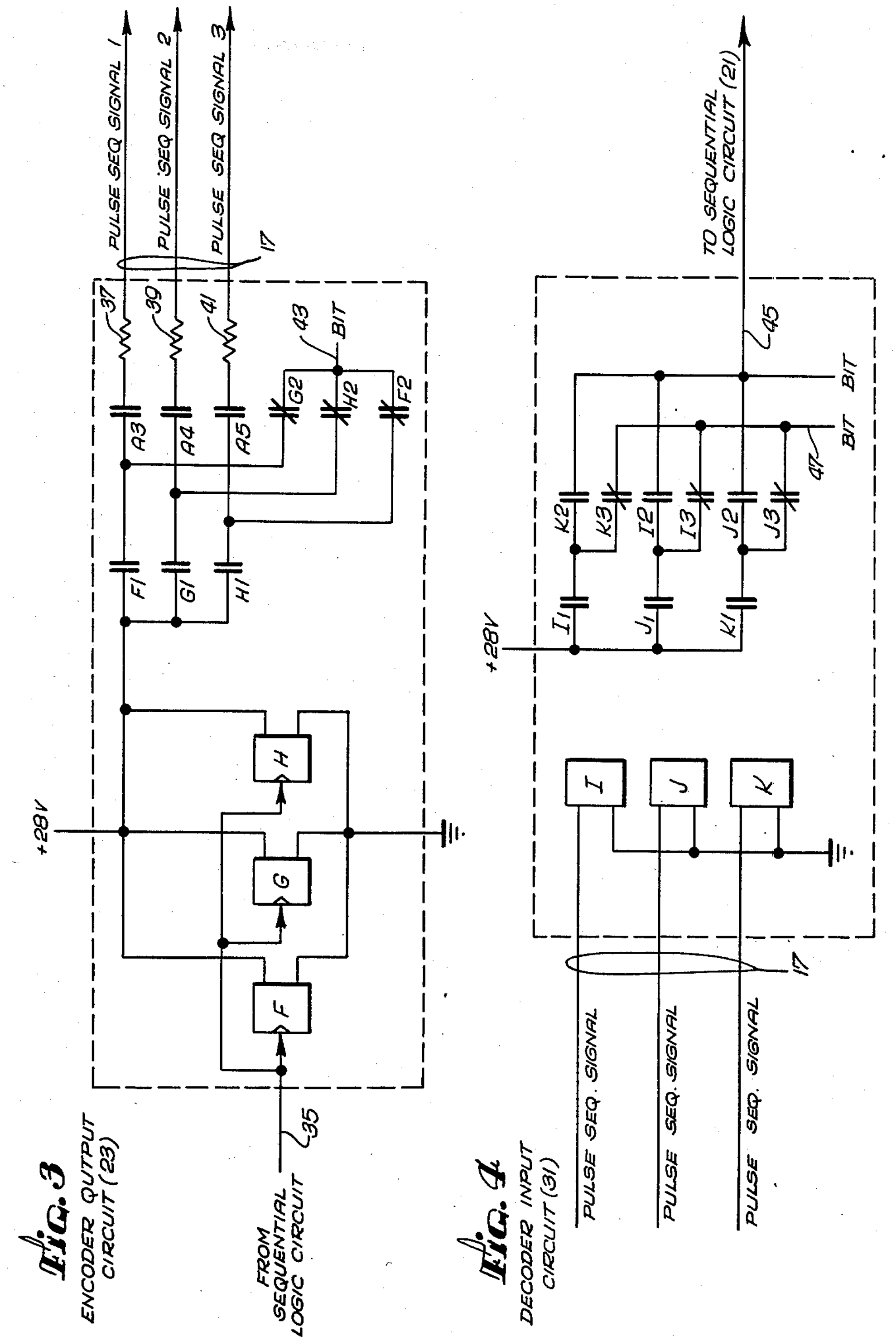
FIG. 3 ENCODER OUTPUT CIRCUIT (23)
FIG. 4 DECODER INPUT CIRCUIT (31)

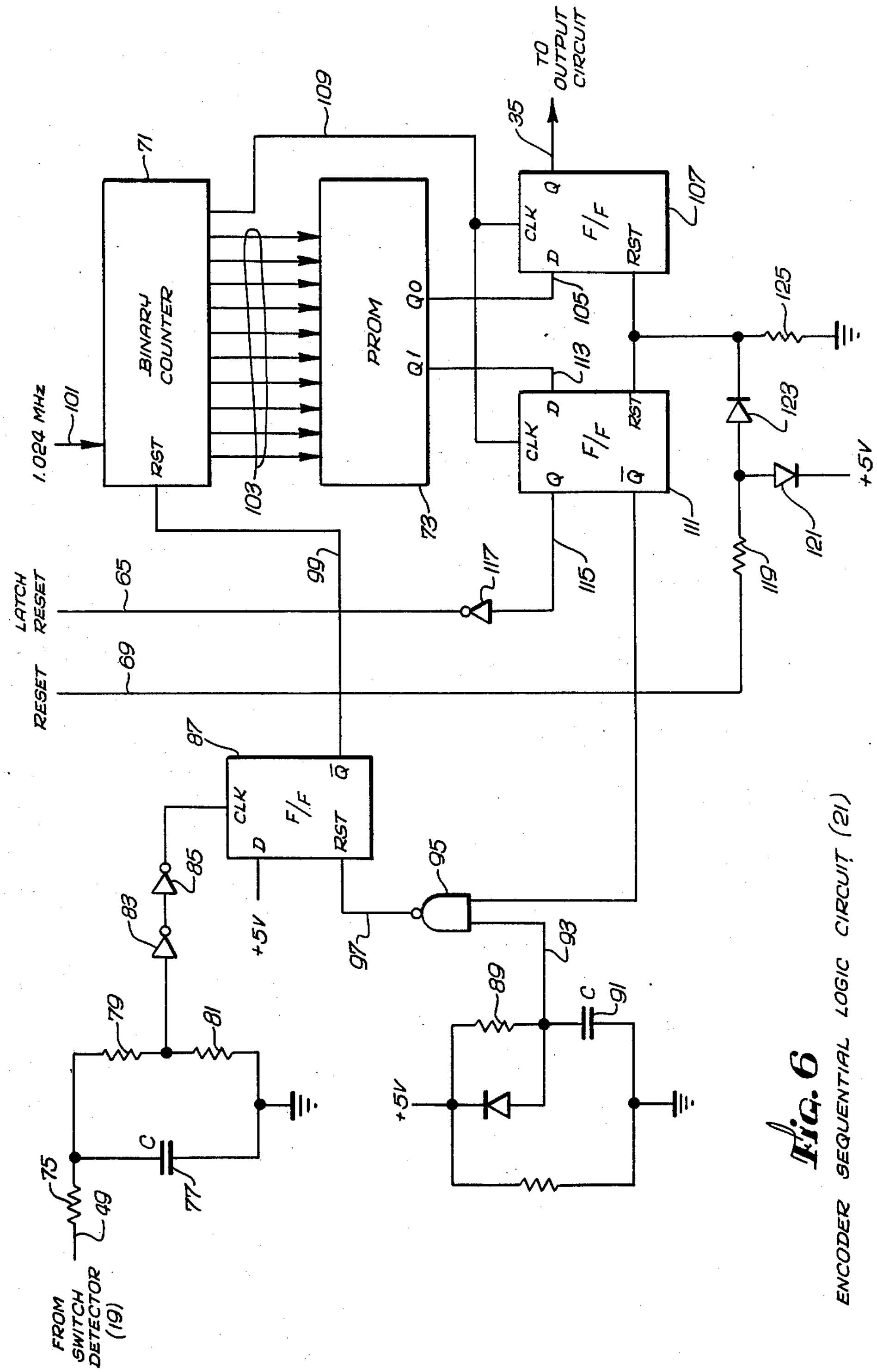
Fig. 6 ENCODER SEQUENTIAL LOGIC CIRCUIT (21)

DECODER SEQUENTIAL LOGIC CIRCUIT (33)

REMOTE CONTROL SYSTEM TRANSMITTING A CONTROL PULSE SEQUENCE THROUGH INTERLOCKED ELECTROMECHANICAL RELAYS

BACKGROUND OF THE INVENTION

This invention relates generally to remote control systems, and, more particularly, to remote control systems of the kind having a central control unit or encoder for transmitting a single sequence of control pulses to a number of separate remote decoders.

In systems of this particular kind, the central control unit typically produces a sequence of voltage pulses for transmission to the various remote units either separately or on a common transmission line. Each remote unit counts the successive pulses it receives, and, when a predetermined count is reached, it performs a predetermined function, such as turning on or off an associated device.

Systems of this particular kind are useful in a number of different fields, including, for example, the emergency jettisoning of stores on military aircraft, the emergency shutdown of arrays of sensitive equipment, and the sequential detonation of explosive charges in geophysical prospecting. In such applications, it is extremely important that a number of different events occur in a predetermined sequence, at specific, well-defined time intervals. In the case of an emergency stores jettison system, for ejecting a number of remote stores (i.e., releasable weapons and external fuel tanks) from an aircraft on an emergency basis, the relative timing of the ejections must be closely controlled to prevent dangerous collisions. Accordingly, a high reliability of performance is essential.

There is therefore a need for a remote control system that can properly perform a number of remote tasks in a prescribed sequence and at prescribed time intervals, and in a highly reliable fashion. In particular, there is a need for such a system that can properly perform the tasks even when individual elements of the system might fail. The present invention fulfills this need.

SUMMARY OF THE INVENTION

The present invention is embodied in a remote control system, and a related method, that can perform a predetermined remote function in a reliable fashion, with a significant reduction in the possibility of a component failure ever preventing the performance of the function or ever causing the performance of the function at an undesired time. The system includes controller means for producing a predetermined sequence of control pulses, and remote means for counting the individual pulses in the sequence of pulses and for performing the predetermined function when a selected count is reached. In accordance with the invention, the system further includes transmission means for transmitting the sequence of control pulses from the controller means to the remote means using a plurality of devices, e.g., electromechanical relays, connected together and controllably actuated such that a failure of any one device in the transmission means will neither cause the remote means to perform its function at an undesired time nor prevent the remote means from performing its function at the desired time. This configuration greatly improves the system's reliability.

More particularly, the remote control system of the invention includes a plurality of substantially identical remote means, all receiving the same sequence of control pulses from the controller means. Each remote means performs a different predetermined function in response to an individually selected one of the successive pulses, and each can include programmable means for selecting the particular pulse to which it responds.

The sequence of control pulses produced by the controller means is a binary signal, with the duration of each pulse and the spacing between successive pulses being individually selected. This can be accomplished using a read-only memory along with means for sequentially addressing the memory and stringing together the retrieved data to form the control pulse sequence. Each remote means counts the successive pulses in the control pulse sequence, and produces an output pulse when the selected count is reached. This output pulse occurs for as long a duration as the corresponding control pulse.

In another aspect of the invention, the previously mentioned devices of the transmission means are all electromechanical relays, and they are distributed in the system, with a first set located with the controller means and a second set located with each remote means. The first set includes at least three relays, each being associated with a separate transmission line connecting it to the second set in each remote means. The interface between the controller means and each remote means is thereby triple redundant, substantially enhancing the system's reliability.

Each relay in the first set is controllably actuated in accordance with the sequence of control pulses produced by the controller means, and a set of electrical contacts in each relay transmits a corresponding signal along the associated transmission line. The transmission means further includes an additional relay having a set of electrical contacts in series with those of the first set. This additional relay is controllably actuated by switch means that also functions to actuate the controller means. As a result, a failure of any solid state portion of the controller means cannot cause any of the remote means to perform its function if the switch means hasn't first been actuated.

In another aspect of the invention, the switch means includes three poles, and the controller means detects actuation of it using three separate electromechanical relays, each associated with a different pole. Electrical contacts of the three relays are connected in a majority logic configuration comprised of three converging legs, each leg including sets of contacts from two different relays, arranged in series. In this way, a failure in any one pole of the switch means or in any one relay is not detected by the controller means as an actuation of the switch means.

The relays in the second set, i.e., the set associated with each remote means, are each responsive to the control pulse signal transmitted on a separate transmission line and each includes two associated sets of electrical contacts. The contacts are connected in a majority logic configuration comprised of three converging legs, each leg including sets of contacts from two different relays, arranged in series. In this way, a failure of any one relay in the set can neither prevent proper reception of a transmitted control pulse nor create a spurious control pulse.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 2 is a timing diagram depicting several waveforms present in the system of FIG. 1;

FIG. 3 is a schematic circuit diagram of the output circuit in the emergency jettison encoder of FIG. 1;

FIG. 4 is a schematic circuit diagram of the input circuit in each emergency jettison decoder of FIG. 1;

FIG. 5 is a schematic circuit diagram of the emergency jettison switch and the switch detector in the emergency jettison encoder of FIG. 1;

FIG. 6 is a schematic circuit diagram of the sequential logic circuit in the emergency jettison encoder of FIG. 1.

DESCRIPTION OF THE PREFERRED EMBODIMENT

Figure 1:
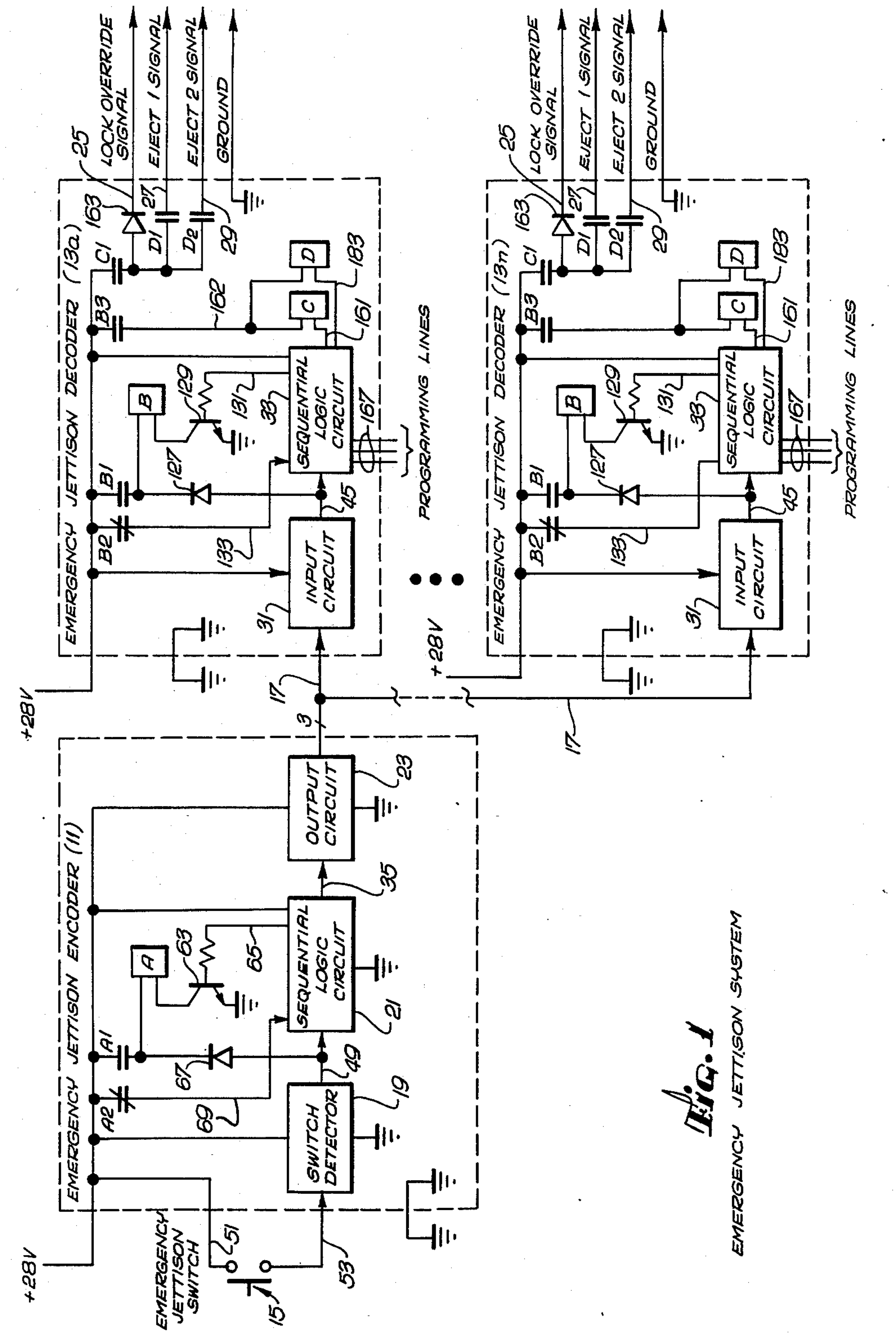
FIG. 1 is a simplified block diagram of a remote control emergency jettison system embodying the present invention.

As shown in the exemplary drawings, the present invention is embodied in a system for the emergency jettisoning of stores (i.e., releasable weapons and external fuel tanks) on a military aircraft. Because of the close proximity of the various stores and the resulting risk of dangerous collisions, it is essential that the stores be released in a prescribed sequence and at well-defined time intervals. As shown in FIG. 1, the system includes an emergency jettison encoder 11 and a plurality of substantially identical remote emergency jettison decoders, two of which are shown at **13*a* and 13*n***. Each such decoder is associated with a separate store or set of stores. For convenience, the corresponding elements shown in both depicted decoders will be identified by the same reference numerals.

Manual actuation of an emergency jettison switch 15 associated with the encoder 11 triggers the encoder to generate a predetermined sequence of control pulses (FIG. 2*a*), for transmission on lines 17 to all of the decoders **13*a*–13*n*. In particular, a switch detector circuit 19 included in the encoder detects actuation of the switch and triggers a sequential logic circuit 21 to produce the pulse sequence. An output circuit 23** then conditions the pulse sequence for transmission to the various decoders. The pulse sequence is transmitted to the decoders either over a single set of lines connected from each decoder to the next, or over a separate set of lines for each decoder.

Upon receipt of the control pulse sequence, each decoder 13 outputs a lock override signal on line 25, for use in releasing a mechanical safety lock for its associated store(s), and also outputs two identical eject pulse signals on lines 27 and 29, for use in firing eject cartridges to eject the unlocked store(s) from the aircraft. The lock override signal is depicted in FIG. 2*b*, and an example of one eject pulse signal is depicted in FIG. 2*d*. More particularly, an input circuit 31 included in each decoder receives and suitably conditions the pulse sequence transmitted on lines 17 from the encoder 11. A sequential logic circuit 33 then initiates the lock override signal upon receipt of the first pulse in the sequence and generates each eject pulse signal when it has received a selected number of control pulses. Electromechanical relays C and D suitably condition the respective signals for output by the system on lines 25, 27 and 29.

Because of the need for jettisoning the various stores in the prescribed sequence and at the prescribed time intervals, it is essential that the emergency jettison system have an extremely high reliability. It is particularly important that the interface between the encoder 11 and the various remote decoders **13*a*–13*n* be highly immune to electromagnetic interference and that the system function to jettison the stores even if there are component failures or if one of the transmission lines 17** is broken.

In accordance with the invention, the output circuit 23 of the encoder 11 generates three identical pulse sequence signals for the coupling on lines 17 to the various remote decoders **13*a*–13*n*, and the input circuit 31** of each decoder receives and suitably combines the three signals. The output circuit and all of the input circuit all include a plurality of electromechanical relays connected together and controllably actuated such that a failure of any one relay will neither transmit an undesired control pulse nor prevent the transmission of a desired control pulse. The interface between the encoder and the various decoders is therefore extremely reliable, and the possibility of the system failing to properly jettison the aircraft's stores is exceedingly low.

With reference now to FIG. 3, there is shown a schematic circuit diagram of the output circuit 23 of the emergency jettison encoder 11. This circuit receives a pulse sequence signal on line 35 from the sequential logic circuit 21, and it supplies three corresponding pulse sequence signals for transmissin on lines 17 to the various decoders **13*a*–13*n***. The circuit includes three electromechanical relays, designated F, G and H, each having a field-effect transistor (FET) in series with a coil and having two sets of electrical contacts, one set of which is normally open and the other set of which is normally closed.

The pulse sequence signal supplied on line 35 is connected to the respective FET gate input terminals of all three relays F, G and H. When a pulse is present in this signal, the relays are triggered to connect 28 volts from a 28-volt supply across their respective coils, to close the normally open contacts, designated F1, G1 and H1, and to open the normally closed contacts, designated F2, G2 and H2.

The three pulse sequence signals for transmission on the three lines 17 are produced by connecting each of the contacts F1, G1 and H1 in series with a separate set of contacts A3, A4 or A5 associated with a relay A, depicted only in FIG. 1. This latter relay is energized, to close its three sets of contacts, upon actuation of the emergency jettison switch 15, and it remains energized until termination of the pulse sequence signal. It will of course be appreciated that if a single relay, e.g., relay A, has an insufficient number of contacts to perform all of the recited functions, two or more relays can be connected in parallel.

It will be appreciated that if the relay A has not been energized, no combination of failures in the sequential logic circuit 21, solid state or otherwise, could produce a control pulse. This is an important safety feature.

More particularly, the first pulse sequence signal is produced by connecting the contacts F1 and A3 and a resistor 37 in series with the 28-volt supply, the second pulse sequence signal is produced by connecting the contacts G1 and A4 and a resistor 39 in series with the 28-volt supply, and the third pulse sequence signal is produced by connecting the contacts H1 and A5 and a resistor 41 in series with the 28-volt supply. Thus, even if one of the relays F, G or H should fail, i.e., its normally open contacts fail to close, two of the pulse sequence signals would still be present on the lines 17. This triple redundant interface between the encoder 11 and the various decoders 13a–13n substantially enhances the system's reliability. Any one line can be broken, because of battle damage or otherwise, and the decoders can still properly jettison their associated stores. The three lines are preferably routed along different paths in the aircraft.

For purposes of testing the encoder output circuit 23 to detect a failure of one or more of its components, the normally closed contacts F2, G2 and H2 are used to produce a built-in test (i.e., BIT) signal for coupling on line 43 to test circuitry (not shown). In particular, the contacts G2 are connected to the node between the contacts F1 and A3, the contacts H2 are connected to the node between the contacts G1 and A4, and the contacts F2 are connected to the node between the contacts H1 and A5. The opposite terminals of the contacts F2, G2 and H2 are ganged together to produce the BIT signal. Since each leg of this built-in test circuit is coupled to the 28-volt supply through both a normally open set of contacts (F1, G1 or H1) and a normally closed set of contacts (A3, A4 or A5), the BIT signal will always be at a low level, except when a failure in one of the three relays has occurred.

The three redundant pulse sequence signals produced by the output circuit 23 of the emergency jettison encoder 11 are transmitted on lines 17 to the various remote emergency jettison decoders 13a–13n. The input circuit 31 of each decoder receives the signals and suitably combines them to produce a single corresponding pulse sequence signal, for coupling on line 45 to the decoder sequential logic circuit 33.

As shown in FIG. 4, the input circuit 31 includes three electromagnetic relays, designated I, J and K, each with two sets of normally open contacts and one set of normally closed contacts. A separate one of the three redundant pulse sequence signals supplied on lines 17 is connected to each of the three relays. The relay contacts are connected in a majority logic configuration such that they generate a pulse for coupling on line 45 to the sequential logic circuit 33 whenever at least two of the relays are energized. In particular, the relay contacts are arranged in three converging legs, each leg having two series-connected sets of normally open contacts from two different relays. One leg includes the contacts I1 and K2, another leg the contacts J1 and I2 and the remaining leg the contacts K1 and J2. One terminal of each of the three legs is connected directly to the 28-volt supply, and the other terminals are ganged together to produce the pulse sequence signal for output on line 45.

In addition, for built-in test purposes, the three sets of normally closed contacts (I3, J3 and K3) are connected to the intermediate nodes of the three previously-mentioned legs. In particular, the contacts K3 are connected to the node between the contacts I1 and K2, the contacts I3 are connected to the node between the contacts J1 and I2, and the contacts J3 are connected to the node between the contacts K1 and J2. The other ends of the respective contacts K3, I3 and J3 are connected together to produce a BIT signals for output on line 47 to the test circuitry (not shown). In addition, the pulse sequence signal present on line 45 is also supplied as a BIT signal to the test circuitry.

It should therefore be appreciated that the interface between the encoder 11 and the various remote decoders 13a–13n is highly reliable. Because of the triple redundant configuration in both the encoder and the decoders, no single failure of a relay or transmission line 17 can cause the transmission or detection of an undesired control pulse or prevent the transmission and proper detection of a desired control pulse. In addition, the interface includes only three lines and a ground return, the latter of which can be formed by the aircraft frame.

Electromechanical relays rarely have failure modes in which they operate inadvertently. Solid state components such as transistors and integrated circuits, on the other hand, usually fail in either a high or a low state. By combining relays and solid state components in the manner described, the system's safety and reliability is much greater than if relays or solid state components were to be used alone, and the system's size, weight and power consumption is much less than if relays were to be used alone. In addition, susceptibility to electromagnetic interference is substantially reduced by using relays, rather than solid state components, to detect input signals to the encoder 11 and decoders 13a–13n.

As previously mentioned, the switch detector 19 of the emergency jettison encoder 11 continuously monitors the emergency jettison switch 15 and outputs a trigger signal for coupling on line 49 to the sequential logic circuit 21 whenever the switch is momentarily actuated. As shown in FIG. 5, the switch includes three poles for triple redundancy. Each pole is normally open, but is closed when the switch pushbutton is actuated. The two sets of switch terminals are connected to the switch detector via lines 51 and 53.

The lines 51 connected to one side of the emergency jettison switch 15 are connected through separate resistors 55 to a common node 57, and, in turn, through a normally open switch 59 to the 28-volt supply. This switch 59 is automatically closed whenever the aircraft is airborne, and it is included in the circuit to prevent an accidental ejection of stores when the aircraft is on the ground. The set of lines 53 connected to the opposite side of the emergency jettison switch are connected to three separate electromagnetic relays, designated L, M and N. The opposite terminals of the relays are connected directly to ground. Thus, the three relays can be energized only when the aircraft is airborne and the emergency jettison switch has been actuated.

The electrical contacts of the three relays L, M and N are arranged in the same majority logic configuration as are the relay contacts of the decoder input circuit 31, described above. In particular, the contacts are arranged in three parallel legs, each including a set of contacts from two different relays. In this way, the binary trigger signal is output on line 49 whenever at least two of the three relays function properly in response to an actuation of the emergency jettison switch 15. Also similar to the decoder input circuit, the contacts are configured to produce a pair of built-in test signals for coupling on lines 49 and 61 to the test circuitry (not shown).

With reference again to FIG. 1, the relay A in the emergency jettison encoder 11 functions like a latch, to permit operation of the encoder even after the momentary actuation of the emergency jettison switch 15 has terminated. The lower terminal of the relay is connected to ground through an NPN transistor 63, whose base terminal is biased on via line 65 by the sequential logic circuit 21. The upper terminal of the relay A is connected to the trigger signal line 49 from the switch detector 19 via a diode 67. In operation, when a trigger signal is output by the switch detector, a positive voltage is coupled through the diode to the relay A, to energize its coil. A set of normally open electrical contacts A1 connected between the 28-volt supply and the upper terminal of the relay A then closes, to latch the relay in its energized state. A set of normally closed contacts A2 connected between the 28-volt supply and the sequential logic circuit 21 simultaneously opens, to remove a reset signal previously applied to the circuit on line 69.

The sequential logic circuit 21 of the emergency jettison encoder 11 is depicted in detail in FIG. 6. In response to a trigger signal supplied on line 49 from the switch detector 19, this circuit generates a predetermined sequence of control pulses for coupling on line 35 to the output circuit 23. The logic circuit includes a binary counter 71 that starts counting upon initial receipt of the trigger signal, and a programmable read-only memory (PROM) 73 whose memory locations are sequentially addressed by the counter. These memory locations store the digital values that string together to produce the pulse sequence signal for output on line 35.

More particularly, the trigger signal supplied to the sequential logic circuit 21 on line 49 from the switch detector 19 is initially filtered for noise immunity by a series resistor 75 and a capacitor 77 shunted to ground. A resistor divider comprised of resistors 79 and 81 reduces the magnitude of the filtered trigger signal to a level compatible with digital logic elements, e.g., 5 volts. The resulting signal is connected through a pair of inverters 83 and 85 to the clock terminal of a D-type flip-flop 87, whose data input terminal is hard wired to a 5-volt supply voltage.

The flip-flop 87 is initially reset using a reset circuit comprised of a resistor 89 and a capacitor 91 connected in series between ground and the 5-volt supply. The node between the resistor and capacitor, whose voltage level slowly rises when power is first provided to the circuit, is connected on line 93 to a NAND gate 95 and, in turn, over line 97 to the reset terminal of the flip-flop 87. Thus, the flip-flop is in its reset state after power is first applied to the logic circuit 21, but is automatically clocked into its set state upon receipt of a trigger signal on line 49 from the switch detector 19.

The signal present at the $\overline{Q}$ terminal of the flip-flop 87, which moves from the logical one state to the logical zero state upon receipt of a trigger signal on line 49 from the switch detector 19, is connected via line 99 to the reset terminal of the counter 71. The counter is then no longer held in its reset state, whereupon it immediately begins counting a 1.024 MHz clock signal supplied to it on line 101 from an oscillator (not shown). Ten of its output terminals, carrying the outputs of ten consecutive binary counter states, are connected via lines 103 to the address input terminals of the PROM, to sequentially address its memory locations.

The least significant bits stored in the various memory locations of the PROM 73 addressed by the counter 71 are used to create the pulse sequence signal for output on line 35. These least significant bits are output by the PROM at its Q0 terminal, and they are updated with each change in the 10-bit address applied to the PROM's address terminals. This Q0 signal is coupled on line 105 to the data input terminal of a D-type flip-flop 107, which is clocked by a clock signal coupled on line 109 from the counter. The clock signal is actually produced by one stage of the binary counter, and it has a frequency higher than that of all ten address signals coupled on lines 103 from the counter to the PROM. The Q output terminal of the flip-flop, which follows the Q0 signal from the PROM, provides the pulse sequence signal output on line 35 to the encoder output circuit 23.

The PROM 73 is programmed such that each of the successive pulses in the pulse sequence signal has a selected duration and occurs a selected time after the preceding pulse. Although the exemplary waveform of FIG. 2a is a simple square wave, it will be appreciated that the system is not so limited.

In an alternative embodiment (not shown in the drawings), the PROM 73 can be eliminated and replaced by one or more gates for combining the signals output by the counter 71 in a predetermined fashion. In this alternative embodiment, all of the successive control pulses will have equal durations and spacings.

As previously mentioned, the PROM 73 is programmed to produce at least as many pulses as are required to identify the particular instants at which one or more predetermined stores or sets of stores are to be jettisoned. After the last such pulse has been output by the flip-flop 107, the sequential logic circuit 21 outputs an appropriate latch reset signal on line 65, to restore the encoder 11 to its initial state, with the relay A de-energized and the flip-flop 107 in its reset state.

This resetting is accomplished using a second flip-flop 111, which is clocked by the same clock signal as the first flip-flop 107, but which has as its data input a signal supplied on line 113 from the Q1 terminal of the PROM 73. This Q1 signal corresponds to the second least significant bit of the information successively addressed in the PROM, and it is programmed to remain continuously in the logical zero state until the last pulse in the pulse sequence signal has been produced, at which time it changes to the logical one state. The Q output terminal of the flip-flop 111, which follows the Q1 signal, is connected via line 115 to an inverter 117, to produce the latch reset signal for output on line 65.

As mentioned above with reference to FIG. 1, the latch reset signal drives the base of the transistor 63 connected in series with the relay A. When this signal changes to the logical zero state, the transistor is turned off and the relay is therefore de-energized. This opens the relay contacts A1, to remove the 28-volt supply voltage from the upper terminal of the relay A. Since the contacts A1 do not open until the current flowing through them has decayed to a small value, contact wear is minimized.

Simultaneously, the relay contacts A2 return to their closed state, to couple a 28-volt reset signal on line 69 to the sequential logic circuit 21. As shown in FIG. 6, this reset signal is coupled through a clamp circuit to the reset terminals of the two flip-flops 107 and 111, to reset them to their initial states. The clamp circuit comprises a series resistor 119 followed by a shunt diode 121 to the 5-volt supply voltage and, in turn, by a series diode 123 and shunt resistor 125 to ground. The resulting reset signal is limited to a voltage level compatible with the two flip-flops.

With reference again to FIG. 1, each of the remote emergency jettison decoders 13a–13n is shown to include a relay B, which functions just like the relay A of the emergency jettison encoder 11, i.e., as a latch, upon receipt of an input pulse. In this case, the input pulse is a control pulse supplied on line 45 from the decoder input circuit 31. Each such control pulse is coupled through a diode 127 to one terminal of the relay B. The other relay terminal is connected through a transistor 129 to ground, with the transistor's base terminal normally biased on by a reset signal supplied on line 131 from the decoder sequential logic circuit 33. Upon initial energizing of the relay B via the diode, a set of normally open relay contacts B1 automatically closes to provide power to the relay B even after the control pulse terminates. Simultaneously, a set of normally closed relay contacts B2 automatically opens to remove a reset signal previously applied on line 133 to the decoder sequential logic circuit 33.

Figure 7:
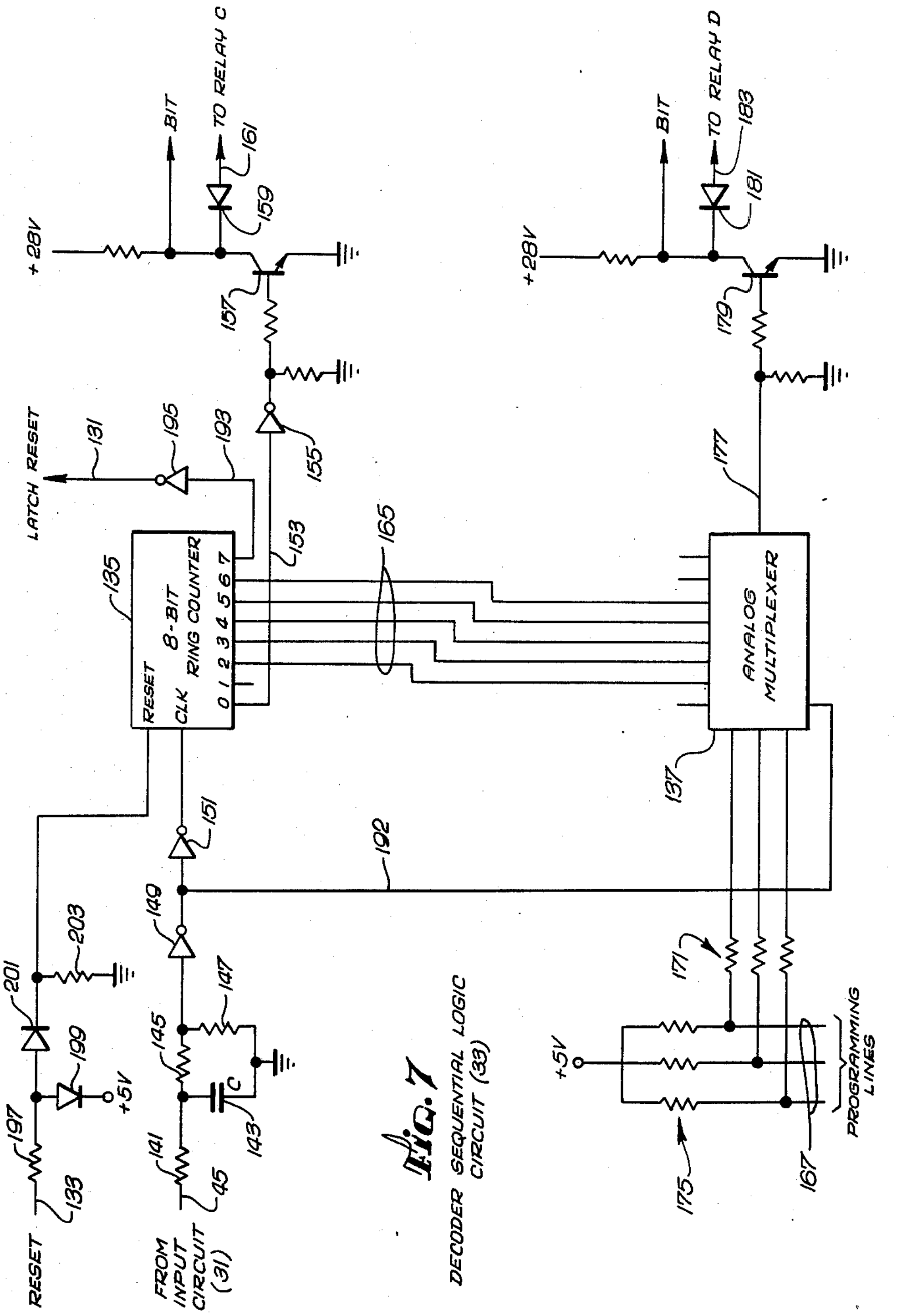
FIG. 7 is a schematic circuit diagram of the sequential logic circuit in each emergency jettison decoder of FIG. 1.

The sequential logic circuit 33 of each of the emergency jettison decoders 13*a*–13*n* is depicted in detail in FIG. 7. It includes an 8-bit ring counter 135 that is incremented upon receipt of each of the successive control pulses, along with an analog multiplexer 137 that receives as its inputs the binary data present in five stages of the ring counter. The multiplexer produces a binary pulse signal that is further conditioned to become the two identical eject pulse signals for output by the decoder on lines 27 and 29 (FIG. 1).

More particularly, the control pulse sequence signal supplied to the sequential logic circuit 33 on line 45 is initially filtered for noise immunity by a series resistor 141 and a capacitor 143 shunted to ground. A resistor divider comprised of resistors 145 and 147 reduces the magnitude of the filtered signal to a level compatible with digital logic elements, e.g., 5 volts, and the resulting signal is connected through a pair of inverters 149 and 151 to the clock terminal of the ring counter 135. The counter, which has an initial state where its zero stage is in a logical one state and its remaining stages are all in a logical zero state, is incremented by one count with the rising edge of each of the successive control pulses. Thus, after N control pulses have been received, the counter's N'th stage will be in the logical one state and its remaining stages will be in the logical zero state.

With reference to both FIG. 1 and FIG. 7, the zero stage of the ring counter 135 is used to produce the lock override signal (FIG. 2*a*) output by the decoder 13 on line 25, as described above. This signal, it will be recalled, is used to release a mechanical lock holding the associated store(s) in a secure position. The signal persists for as long as the last possible eject pulse signals that can be selectively generated. The zero stage signal is transmitted on line 153 from the counter through an inverter 155 to the base terminal of an NPN transistor 157, whose emitter terminal is connected directly to ground. The resulting signal at the transistor's collector terminal is coupled through a diode 159 and over line 161 to the lower terminal of a relay C.

The upper terminal of the relay C is connected on line 162 to a set of normally open contacts B3 (associated with the relay B) that is connected, in turn, to the 28-volt supply. Since the signal on line 161 is present only if the relay B has previously been energized, the contacts B3 will always be closed at this time and power will therefore be coupled through the relay C. A set of normally open contacts C1 associated with the relay C therefore close at this time, to couple the 28-volt supply through a diode 163 and thereby produce the lock override signal for output by the decoder 13 on line 25. It will be appreciated that if the relay B has not been energized, no combination of failures in the sequential logic circuit 33, solid state or otherwise, could produce a lock override signal. This is an important safety feature.

As mentioned above, the multiplexer 137 of each decoder sequential logic circuit 33 is used to produce the two identical eject signals for output by the decoder 13 on lines 27 and 29. The timing of the two eject signals corresponds to that of a selected one of the successive control pulses supplied to the logic circuit on line 45. The selection is performed remotely, at each decoder, to facilitate and expedite testing to determine the appropriate release time for each store, and to avoid the need for additional wiring between the encoder and the decoders.

The eject pulse timing selection is accomplished by coupling the binary data present in the 2nd through the 6th stages of the ring counter 135 on lines 165 to five data input terminals of the analog multiplexer 137. The multiplexer is programmed to select a particular one of these five input lines by a set of programming lines 167 connected via resistors 171 to its address input terminals. Each of the programming lines is connected through a separate current-limiting resistor 175 to the 5-volt supply, but can be selectively connected to ground. Thus, by appropriately selecting the subset of programming lines connected to ground, the multiplexer can be made to select a particular one of the five input signals supplied to it. If, for example, the programming lines are configured such that the third pulse is to be selected, the multiplexer output will change to the logical one state as soon as the third stage (FIG. 2*c*) of the ring counter 135 does so.

The signal output by the multiplexer 137 is transmitted on line 177 to the base terminal of an NPN transistor 179, whose emitter terminal is connected to ground. The resulting signal present at the transistor's collector terminal is coupled through a diode 181 to produce a signal for output by the logic circuit 33 on line 183.

For test purposes, the collector terminals of the transistors 157 and 179 in the decoder sequential logic circuit 33 produce a pair of BIT signals indicating the status of the two transistors. The BIT signal for the transistor 157 is output on line 185 and the BIT signal for the transistor 179 is output on line 187. Pull-up resistors 189 and 191 connect the respective collector terminals to the 28-volt supply.

It will be appreciated that the multiplexer 137 could alternatively be digital rather than analog. In addition, it will be appreciated that more than one multiplexer could alternatively be used, depending on the number of independently-timed releases that must be controlled by each remote decoder 13.

It will also be appreciated that the multiplexer 137 could be eliminated by simply selecting a particular one of the ring counter outputs for direct coupling to the transistor 179. For convenience of selection, this could be accomplished by coupling the counter outputs to terminals located on a housing for the decoder 13 and by selectively connecting a jumper wire to one of them. The multiplexer approach described above is preferred, however, because it confines the signals present at the counter outputs and transistor inputs to the housing interior, where they are less affected by electromagnetic interference, and because it requires fewer terminals located on the decoder housing.

The multiplexer signal output on line 183 by the sequential logic circuit 33 of each decoder 13 is connected to the lower terminal of relays D. The relay's upper terminal is ganged with the upper terminal of the relay C, for coupling on line 162 to the relay contacts B3. Thus, when the transistor 179 is turned on, power is coupled through the relay D, to close the contacts D1 and D2 and thereby couple the 28-volt supply to the output lines 27 and 29. This produces the two respective eject pulse signals.

As is conventional, each eject signal is coupled to a separate one of a pair of dual-redundant electroexplosive eject cartridges. This ensures that no failure of a single set of contacts in the relay D or of a single eject cartridge can prevent an intended release of the store.

The multiplexer 137 is enabled only during the actual times that a control pulse is present on line 45. This is accomplished by coupling the signal present at the node 192 between the two inverters 149 and 151 to an INHIBIT input terminal on the multiplexer. The multiplexer output signal and its corresponding eject signal (FIG. *2d*) therefore change to the logical one state when the selected stage (FIG. *2c*) of the ring counter 135 does so, but returns to the logical zero state upon termination of the corresponding control pulse (FIG. *2a*).

When the ring counter 135 has been incremented to its last state, with its 7th stage in the logical one state, the decoder 13 resets itself to the state it was in prior to receipt of any of the successive control pulses. This is accomplished by coupling the 7th stage signal on line 193 from the counter through an inverter 195 to produce the latch reset signal for output on line 131. This signal, it will be recalled, drives the base terminal of the transistor 129 associated with the latching relay B. Thus, when the counter has finally been incremented to the point where its 7th stage is in the logical one state, the latch reset signal changes to the logical zero state, to uncouple power from the relay B. This opens the set of relay contacts B1, to remove the 28-volt supply from the upper terminal of the relay and thereby inhibit energizing of the relays C and D even after the latch reset signal terminates.

Simultaneously, the relay contacts B2 return to the closed state, to couple a reset signal on line 133 to the sequential logic circuit 33. This reset signal is coupled through a clamp to the reset terminal of the ring counter 135, to return it to its initial state, with only its zero stage in the logical one state. The clamp includes a series resistor 197 and shunt diode 199 to a 5-volt supply followed by a series diode 201 and shunt resistor 203 to ground. This limits the reset signal to a voltage level compatible with that of the ring counter. The reset signal functions to terminate the lock override signal a short time after the rising edge of the 7th control pulse, as shown in FIG. *2b*.

The 28-volt supply is preferably provided by an extremely reliable power system, which provides power even if all but one of the aircraft's power sources might fail. In addition, the emergency jettison encoder 11 and the remote emergency jettison decoders **13*a*–13*n*** all contain their own power supplies (not shown), for using the 28-volt supply to produce the various voltages required by their respective logic elements.

It will be appreciated from the foregoing description that the present invention provides an extremely reliable remote control system of the kind having a central encoder for transmitting a single sequence of control pulses to a number of remote decoders, each of which performs a predetermined function when it has received a selected number of pulses. The encoder and all of the decoders include a number of electromechanical relays arranged in a special triple redundant configuration such that no single failure in any of these relays or in any interconnecting line between the encoder and the decoders can cause a decoder to perform its function at an undesired time or can prevent a decoder from properly performing its function at a desired time. In addition, no failure of any solid state device in the encoder or decoders can cause a decoder to perform its function at an undesired time.

Although the invention has been described in detail with reference to the presently preferred embodiment, it will be appreciated by those of ordinary skill in the art that various modifications can be made without departing from the invention. Accordingly, the invention is limited only by the following claims.

I claim:

1. A remote control system comprising:

controller means for producing a predetermined sequence of control pulses;

switch means for controllably actuating the controller means;

remote means for counting the individual pulses in the sequence of control pulses and for performing a predetermined function when a selected count is reached; and transmission means for transmitting the sequence of control pulses from the controller means to the remote means, the transmission means including a first electromechanical relay actuated by the sequence of control pulses produced by the controller means, and a second electromechanical relay actuated by the switch means, wherein the respective first and second electromechanical relays are connected together to transmit the sequence of control pulses to the remote means only if both relays have been actuated, whereby, if the switch means has not controllably actuated both the controller means and the second relay, one or more failures in any portion of the controller means cannot cause the transmission means to transmit an undesired control pulse to the remote means.

2. A remote control system as defined in claim 1, wherein:

the system further includes a plurality of additional remote means, each for counting the individual pulses in the sequence of control pulses and for performing a separate predetermined function when a selected count is reached; and the transmission means transmits the sequence of control pulses to each of the remote means.

3. A remote control system as defined in claim 2, wherein each of the remote means includes programmable means for selecting the particular pulse in the sequence of control pulses to which it responds.

4. A remote control system as defined in claim 1, wherein:

the sequence of control pulses produced by the controller means is a binary signal; and the controller means includes memory means for individually selecting the duration of each control pulse in the sequence of control pulses and the time delay from each control pulse to the next.

5. A remote control system as defined in claim 1, wherein the remote means includes pulse means for producing an output pulse whose timing and duration is controlled in accordance with the sequence of control pulses.

6. A remote control system as defined in claim 5, wherein:

the remote means further includes means for counting the successive pulses in the sequence of control pulses and for producing a trigger signal when a selected count is reached; and the pulse means produces the output pulse when the counting means produces the trigger signal, the output pulse having a duration the same as that of the corresponding control pulse.

7. A remote control system as defined in claim 1, wherein:

the transmission means includes a first set of at least three electromechanical relays, one of which is the first electromechanical relay, and a corresponding number of transmission lines, each associated with a separate relay;

each of the electromechanical relays is controllably actuated in accordance with the sequence of control pulses produced by the controller means; and each of the electromechanical relays of the first set includes a set of electrical contacts for transmitting a signal corresponding to the sequence of control pulses along its associated transmission line.

8. A remote control system as defined in claim 7, wherein:

the first set of electromechanical relays is associated with the controller means;

the system further includes a second set of at least three electromechanical relays associated with the remote means, each relay in the second set being reponsive to the signal transmitted on a separate one of the transmission lines and each relay in the second set including two associated sets of electrical contacts; and the respective sets of electrical contacts of the relays in the second set are arranged in three converging legs, each leg including sets of contacts from two different relays, arranged in series.

9. A remote control system as defined in claim 1, wherein:

the remote means includes a third electromechanical relay having a set of electrical contacts producing an output signal for performing the predetermined function; and the transmission means includes a fourth electromechanical relay having a set of contacts connected in series with the electrical contacts of the third relay;

whereby a failure of any portion of the remote means cannot cause it to perform the predetermined function unless it has received a control pulse from the transmission means.

10. A remote control system as defined in claim 1, wherein:

the switch means includes at least three poles;

the controller means includes at least three electromechanical relays, each connected to a separate pole of the switch means and each including two associated sets of electrical contacts; and the respective sets of electrical contacts of the relays of the controller means are arranged in three converging legs, each leg including sets of contacts from two different relays, arranged in series.

11. A remote control system as defined in claim 1, wherein:

the system further includes an enclosure for enclosing the remote means; and the transmission means includes at least one transmission line for transmitting the sequence of control pulses to the remote means enclosure, and at least one electromechanical relay enclosed by the remote means enclosure, for receiving the sequence of control pulses transmitted over the transmission line and coupling it to the remote means, whereby the sensitivity of the remote means to electromagnetic interference is minimized.

12. A remote control system as defined in claim 11, wherein:

the system further includes switch means for producing a digital control signal, and at least one input transmission line for transmitting the digital control signal from the switch means to the controller means, to condition the controller means to produce the sequence of control pulses; and the controller means includes at least one electromechanical relay for receiving the digital control signal transmitted by the input transmission line, whereby the sensitivity of the controller means to electromagnetic interference is minimized.

13. A method for remotely controlling a predetermined function, comprising steps of:

producing a predetermined sequence of control pulses using a central controller unit;

counting the individual pulses in the sequence of control pulses using a remote unit and performing the predetermined function when a selected count in reached;

transmitting the sequence of control pulses from the central controller unit to the remote unit, the step of transmitting using first and second electromechanical relays having sets of electrical contacts and connected in series with each other; and controllably actuating both the central controller unit, to produce the sequence of control pulses, and the second electromechanical relay, to close its set of electrical contacts;

wherein the step of transmitting includes a step of actuating the first electromechanical relay in accordance with the sequence of control pulses, and whereby, if the step of controllably actuating has not actuated both the central controller unit and the second electromechanical relay, one or more failures in any portion of the central controller unit cannot cause the step of transmitting to transmit an undesired control pulse to the remote unit.

14. A method as defined in claim 13, wherein:

the method further includes steps of counting the individual pulses in the sequence of control pulses using a plurality of additional remote units and performing a separate predetermined function when a selected count is reached by each remote unit; and the step of transmitting transmits the sequence of control pulses to each of the remote units.

15. A method as defined in claim 14, wherein the step of counting performed by each of the remote units includes a step of programming the unit to select the particular pulse in the sequence of control pulses to which it responds.

16. A method as defined in claim 13, wherein:

the sequence of control pulses produced in the step of producing is a binary signal; and the step of producing includes a step of using a memory device for individually selecting the duration of each control pulse in the sequence of control pulses and the time delay from each control pulse to the next.

17. A method as defined in claim 13, wherein the step of counting and performing includes a step of producing an output pulse whose timing and duration is controlled in accordance with the sequence of control pulses.

18. A method as defined in claim 17, wherein:

the step of counting and performing further includes a step of producing a trigger signal when a selected count is reached; and the step of producing the output pulse is performed when the trigger signal is produced, the output pulse having a duration the same as that of the corresponding control pulse.

19. A method as defined in claim 13, wherein:

the step of transmitting including a step of controllably actuating a first set of at least three electromechanical relays, one of which is the first electromechanical relay, in accordance with the sequence of control pulses produced in the step of producing; and each of the electromechanical relays of the first set includes a set of electrical contacts for transmitting a signal corresponding to the sequence of control pulses along a separate, associated transmission line.

20. A method as defined in claim 19, wherein:

the first set of electromechanical relays is associated with the controller unit;

the method further includes a step of arranging a second set of at least three electromechanical relays to receive the signal transmitted on a separate one of the transmission lines; and the step of arranging arranges respective sets of electrical contacts of the relays in the second set in three converging legs, each leg including a set of contacts from two different relays, arranged in series.

21. A method as defined in claim 13, wherein:

the remote unit used in the step of counting and performing includes a third electromechanical relay having a set of electrical contacts producing an output signal for performing the predetermined function; and the step of transmitting uses a fourth electromechanical relay having a set of contacts connected in series with the electrical contacts of the third relay;

whereby a failure of any portion of the remote unit cannot cause it to perform the predetermined function unless it has received a sequence of control pulses in the step of transmitting.

22. A method as defined in claim 13, wherein:

the switch used in the step of controllably actuating includes three poles; and the step of producing includes steps of connecting a separate electromechanical relay to each pole of the switch, each relay including two associated sets of electrical contacts, and arranging the sets of contacts of the relays used in the step of connecting in three converging legs, each leg including sets of contacts from two different relays, arranged in series.

23. A remote control system comprising:

controller means for producing a predetermined sequence of control pulses;

switch means for controllably actuating the controller means;

a plurality of remote means, each for counting the individual pulses in the sequence of control pulses and for performing a separate predetermined function when a selected count is reached, each of the remote means including means for counting the successive pulses in the sequence of control pulses and for producing a trigger signal when a selected count is reached, and pulse means for producing an output pulse when the counting means produces the trigger signal, the output pulse having a duration the same as that of the corresponding control pulse; and transmission means for transmitting the sequence of control pulses from the controller means to each of the remote means, the transmission means including a first electromechanical relay controllably actuated by the sequence of control pulses produced by the controller means, the relay including a set of electrical contacts, a transmission line, a second electromechanical relay having a set of electrical contacts connected in series with the set of contacts of the first electromechanical relay to produce a signal for transmission by the transmission line, wherein the switch means further operates to controllably actuate the second electromechanical relay, whereby, if the switch means has not controllably actuated both the controller means and the second relay, one or more failures in any portion of the controller means cannot cause the transmission means to transmit an undesired control pulse to the remote means, and a plurality of third electromechanical relays, each associated with a separate remote means and each actuated by the signal transmitted by the transmission line, each of the third relays having a set of electrical contacts connected to transmit the sequence of control pulses to its associated remote means;

wherein the pulse means of each remote means includes a fourth electromechanical relay having a set of electrical contacts connected to produce the output pulse; and wherein the transmission means further includes a plurality of fifth electromechanical relays, each associated with a separate remote means and each actuated upon receipt of the sequence of control pulses by the associated third electromechanical relay, each of the fifth relays having a set of electrical contacts connected in series with the associated fourth relay, whereby a failure of any portion of any remote means cannot cause it to produce its output pulse unless it has received the sequence of control pulses from the transmission means.

24. A remote control system comprising:

controller means for producing a predetermined sequence of control pulses;

a plurality of remote means, each for counting the individual pulses in the sequence of control pulses and for performing a separate predetermined function when a selected count is reached, each of the remote means including programmable means for selecting the particular pulse in the sequence of control pulses to which it responds; and transmission means for transmitting the sequence of control pulses from the controller means to each of the remote means, the transmission means including a plurality of devices connected together and controllably actuated such that a failure of any one device can neither cause the remote means to perform the predetermined function at an undesired time nor prevent the remote means from performing the predetermined function at the desired time.

25. A remote control system comprising:

controller means for producing a predetermined sequence of binary control pulses, the controller means including memory means for individually selecting the duration of each control pulse in the sequence of control pulses and the time delay from each control pulse to the next;

remote means for counting the individual pulses in the sequence of control pulses and for peforming a predetermined function when a selected count is reached; and transmission means for transmitting the sequence of control pulses from the controller means to the remote means, the transmission means including a plurality of devices connected together and controllably actuated such that a failure of any one device can neither cause the remote means to perform the predetermined function at an undesired time nor prevent the remote means from performing the predetermined function at the desired time.

26. A remote control system as defined in claim 25, wherein:

the memory means includes a read-only memory; and the controller means further includes means for sequentially retrieving the information stored in a plurality of different memory locations in the read-only memory and for stringing together the retrieved information to form the sequence of control pulses.

27. A remote control system comprising:

controller means for producing a predetermined sequence of control pulses;

remote means for counting the individual pulses in the sequence of control pulses and for performing a predetermined function when a selected count is reached; and transmission means for transmitting the sequence of control pulses from the controller means to the remote means, the transmission means including a first set of at least three electromechanical relays and a corresponding number of transmission lines, each associated with a separate relay;

wherein each of the electromechanical relays is controllably actuated in accordance with the sequence of control pulses produced by the controller means and each of the electromechanical relays includes a set of electrical contacts for transmitting a signal corresponding to the sequence of control pulses along its associated transmission line;

wherein the transmission means further includes a fourth electromechanical relay having a set of electrical contacts connected in series with the electrical contacts of the first set of electromechanical relays;

and wherein the system further includes switch means for controllably actuating both the controller means, to produce the sequence of control pulses, and the fourth electromechanical relay, to close its electrical contacts;

whereby, if the switch means has not controllably actuated both the controller means and the fourth electromagnetic relay, a failure of any portion of the controller means cannot cause the remote means to perform the predetermined function.

28. A method for remotely controlling a predetermined function, comprising steps of:

producing a predetermined sequence of control pulses using a central controller unit;

counting the individual pulses in the sequence of control pulses using a plurality of remote units and performing a separate predetermined function when a selected count is reached by each remote unit, the step of counting performed by each of the remote units including a step of programming the unit to select the particular pulse in the sequence of control pulses to which it responds; and transmitting the sequence of control pulses from the central controller unit to each of the remote units, the step of transmitting including steps of connecting together a plurality of devices and controllably actuating the devices such that a failure of any one device can neither cause the remote unit to perform the predetermined function at an undesired time nor prevent the remote unit from performing the predetermined functon at the desired time.

29. A method for remotely controlling a predetermined function, comprising steps of:

producing a predetermined sequence of binary control pulses using a central controller unit, the step of producing including a step of using a memory device for individually selecting the duration of each control pulse in the sequence of control pulses and the time delay from each control pulse to the next;

counting the individual pulses in the sequence of control pulses using a remote unit and performing the predetermined function when a selected count is reached; and transmitting the sequence of control pulses from the central controller unit to the remote unit, the step of transmitting including steps of connecting together a plurality of devices and controllably actuating the devices such that a failure of any one device can neither cause the remote unit to perform the predetermined function at an undesired time nor prevent the remote unit from performing the predetermined function at the desired time.

30. A method as defined in claim 29, wherein:

the memory device used in the step of using is a read-only memory; and the step of producing further includes a step of sequentially retrieving the information stored in a plurality of different memory locations in the read-only memory and stringing together the retrieved information to form the sequence of control pulses.

31. A method for remotely controlling a predetermined function, comprising steps of:

producing a predetermined sequence of control pulses using a central controller unit;

counting the individual pulses in the sequence of control pulses using a remote unit and performing the predetermined function when a selected count is reached; and transmitting the sequence of control pulses from the central controller unit to the remote unit, the step of transmitting including steps of controllably actuating a first set of at least three electromechanical relays in accordance with the sequence of control pulses produced in the step of producing each of the electromechanical relays including a set of electrical contacts for transmitting a signal corresponding to the sequence of control pulses along a separate, associated transmission line, and connecting a set of electrical contacts for a fourth electromechanical relay in series with the electrical contacts of the first set of electromechanical relays; and controllably actuating both the controller unit, to produce the sequence of control pulses, and the fourth electromechanical relay, to close its electrical contacts;

whereby, if the step of controllably actuating has not actuated both the controller unit and the fourth electromechanical relay, a failure of any portion of the controller unit cannot cause the remote unit to perform the predetermined function.

32. A remote control system comprising:

controller means for producing a predetermined sequence of control pulses;

remote means including means for counting the individual pulses in the sequence of control pulses, and a first electromechanical relay having a set of electrical contacts for producing an output signal to perform a predetermined function when a selected count is reached;

transmission means for transmitting the sequence of control pulses from the controller means to the remote means; and a second electromechanical relay actuated by the sequence of control pulses transmitted by the transmission means;

wherein the respective first and second electromechanical relays are connected together to transmit the output signal only if both relays have been actuated, whereby, if the sequence of control pulses transmitted by the transmission means has not controllably actuated both the remote means and the second relay, one or more failures in any portion of the remote means cannot cause the remote means to output the output signal.

* * * * *